Nov. 21, 1933.  R. H. UPSON  1,935,824
AIRCRAFT CONTROL MEANS
Original Filed April 29, 1930  5 Sheets-Sheet 2
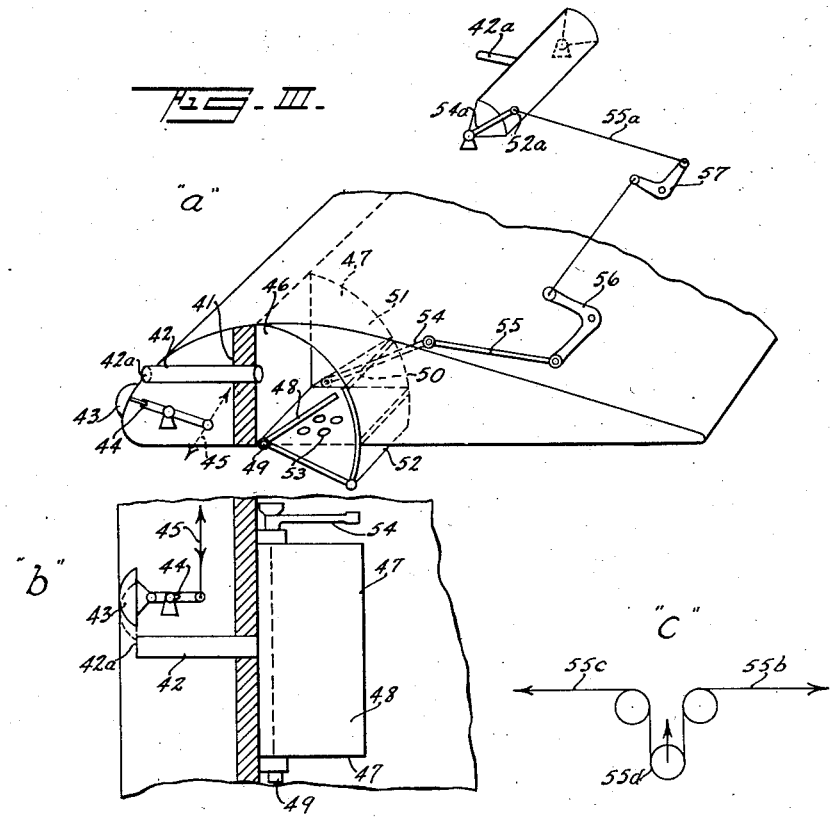
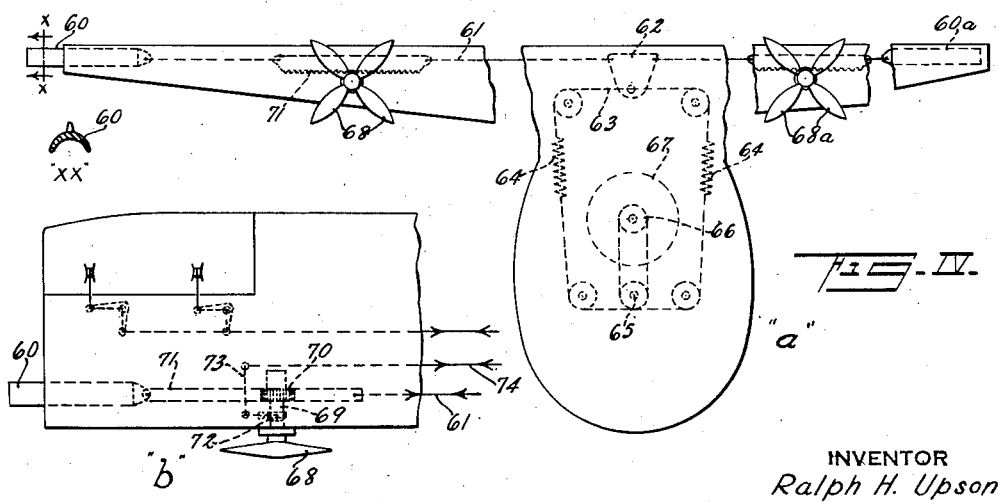
INVENTOR
Ralph H. Upson.

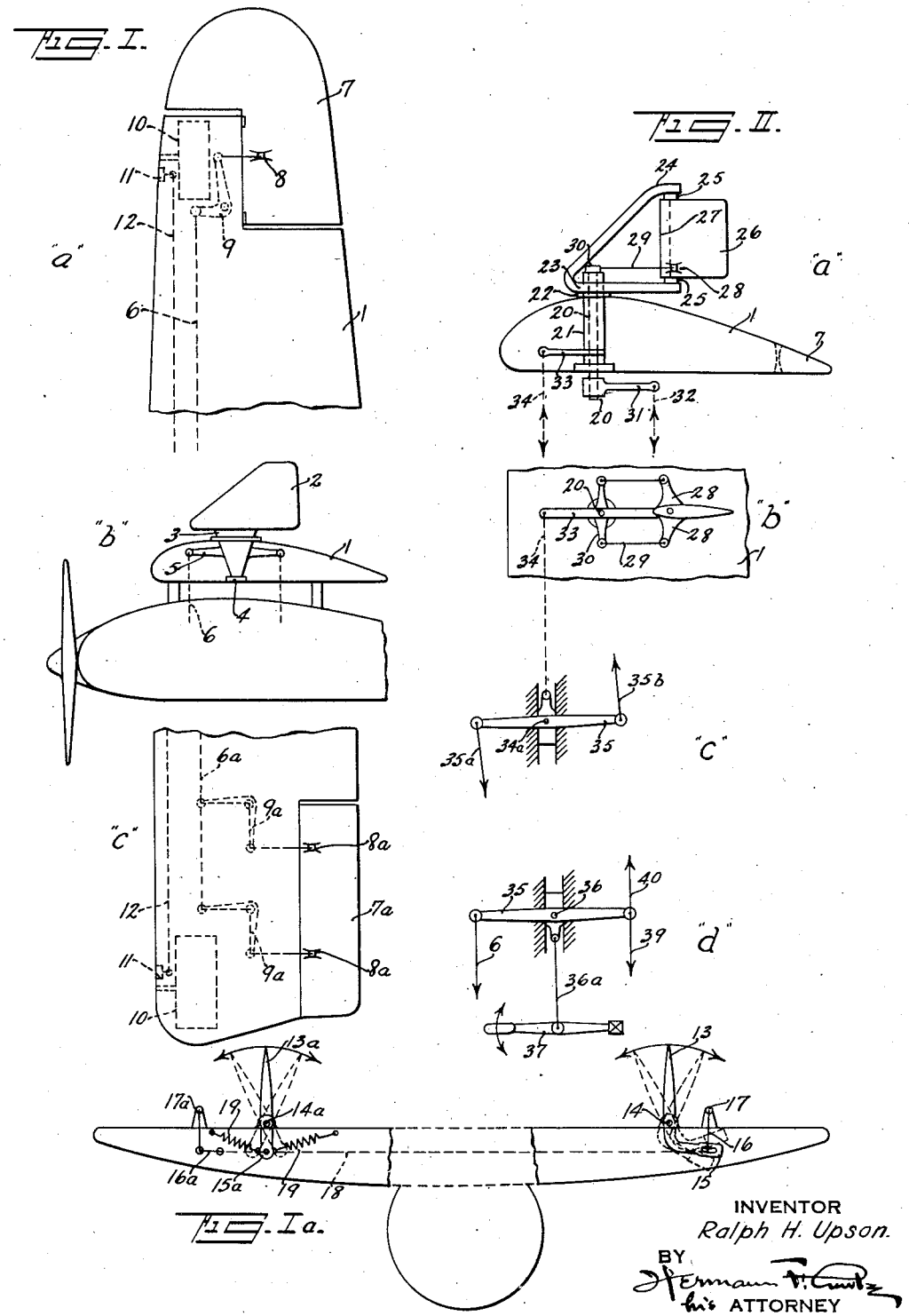

Nov. 21, 1933.  R. H. UPSON  1,935,824
AIRCRAFT CONTROL MEANS
Original Filed April 29, 1930  5 Sheets-Sheet 3
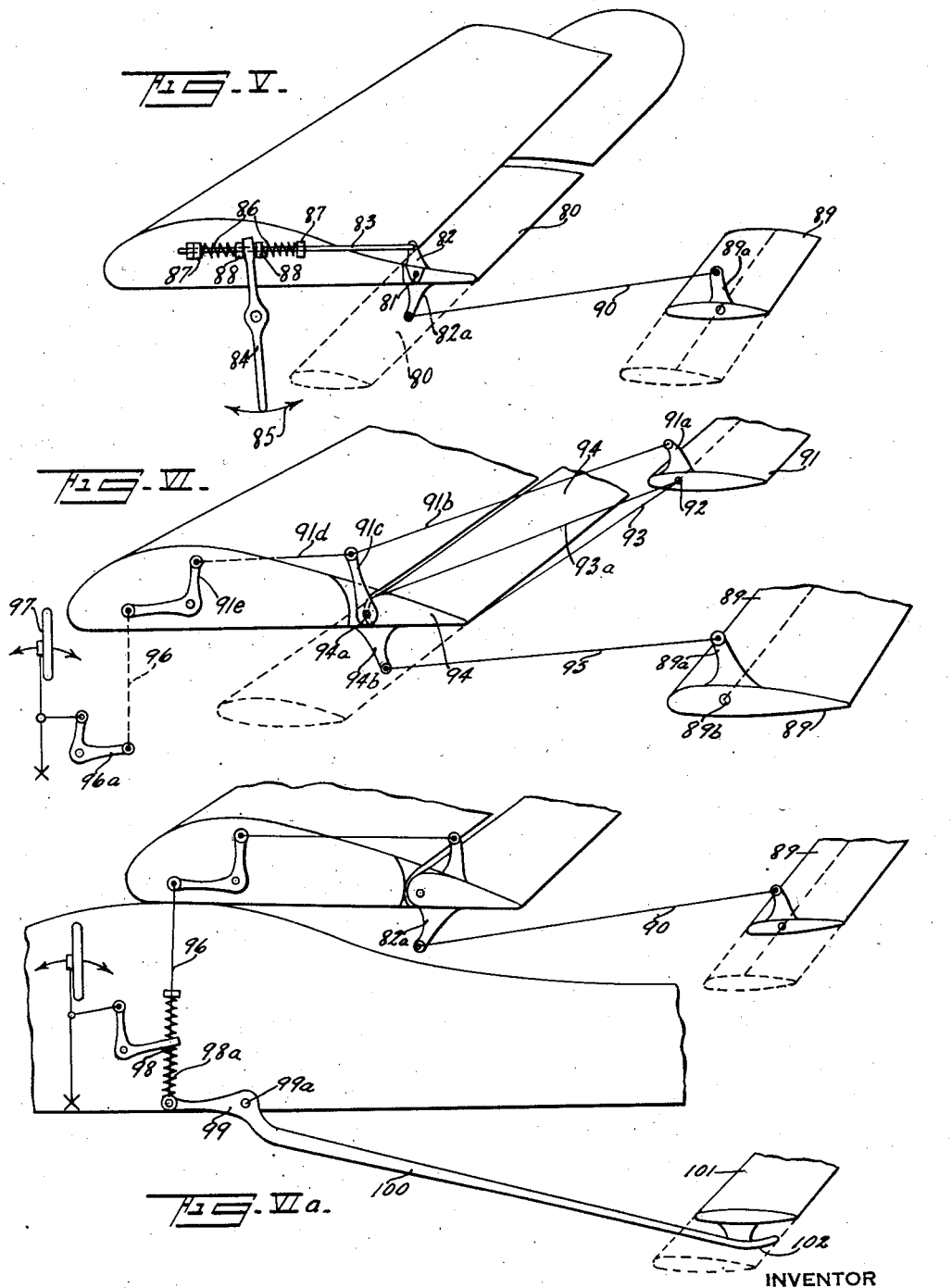
INVENTOR
*Ralph H. Upson*
BY
ATTORNEY Nov. 21, 1933.  R. H. UPSON  1,935,824
AIRCRAFT CONTROL MEANS
Original Filed April 29, 1930   5 Sheets-Sheet 4
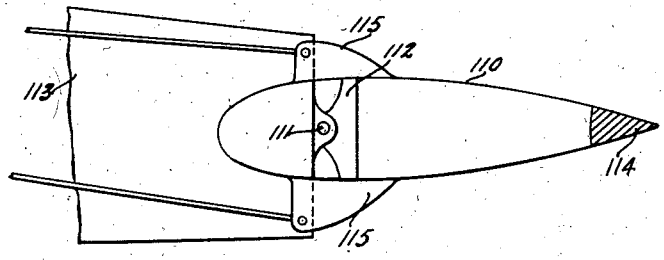
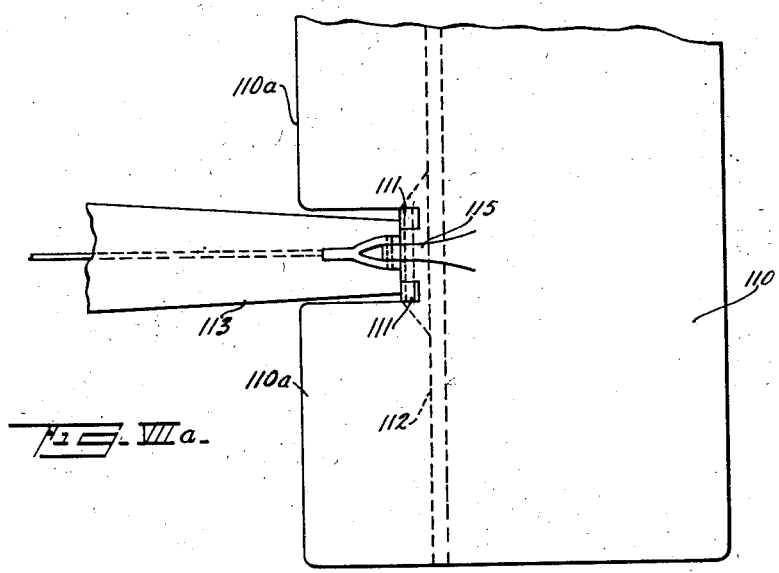
INVENTOR
*Ralph H. Upson*
BY
*his* ATTORNEY Nov. 21, 1933.   R. H. UPSON.   1,935,824
AIRCRAFT CONTROL MEANS
Original Filed April 29, 1930    5 Sheets-Sheet 5
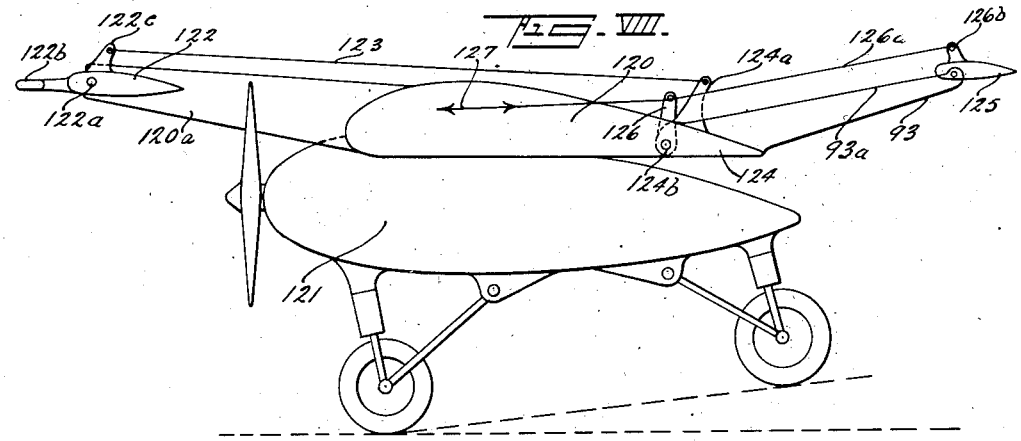
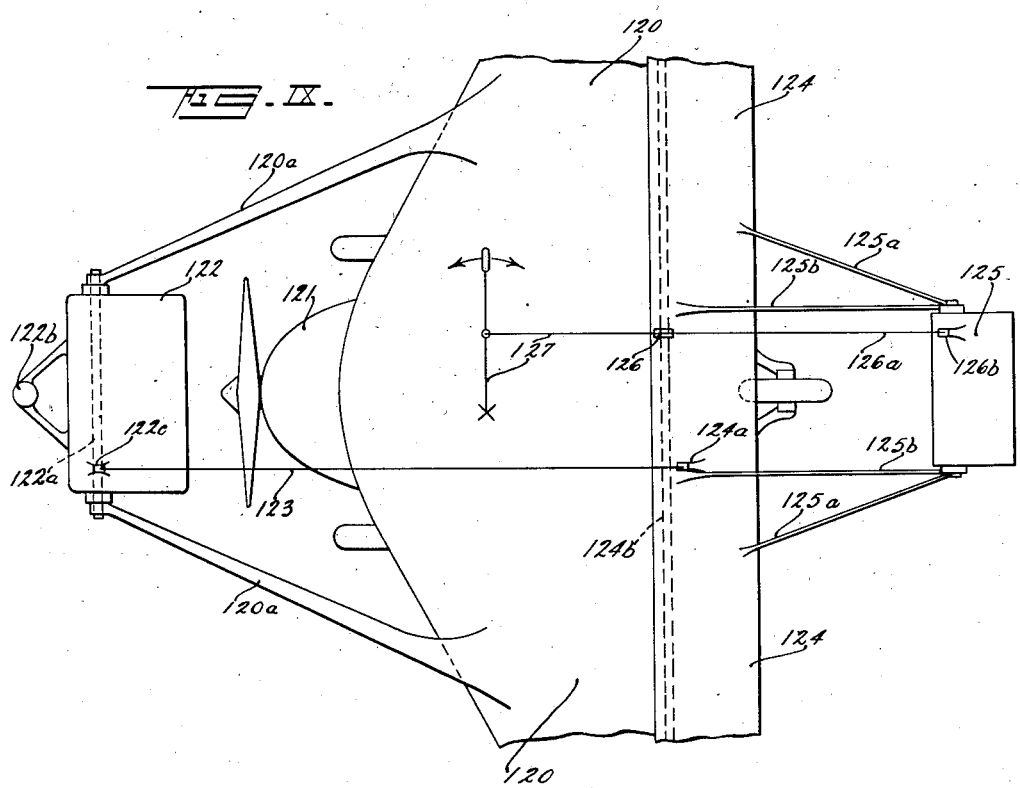
INVENTOR
Ralph H. Upson.
BY
his ATTORNEY Patented Nov. 21, 1933

1,935,824

UNITED STATES PATENT OFFICE 1,935,824

AIRCRAFT CONTROL MEANS

Ralph H. Upson, Red Bank, N. J.

Application April 29, 1930, Serial No. 448,212
Renewed April 10, 1933

32 Claims. (Cl. 244—29)

My inventions herein set forth relate to the control of aircraft, and particularly airplanes, that is the various types of heavier-than-air machines. They involve the control system in its broad sense, namely, for stability as well as maneuverability, and this application is addressed to various positive means for imposing any desired movement upon the airplane and in various forms and elements to automatically or semi-automatically maintain a desired movement or attitude of the plane. These inventions are in part complementary to the inventions set forth in a co-pending application which is mainly concerned with instruments and means for indicating what is happening to the motion of the plane, in order that the proper control may then be imposed voluntarily and maintained semi-automatically or automatically. Involved in my invention in this case are elements and means aerodynamically responsive to effect, correct or maintain attitude of flight. This is not to be confused with the inherent action of gyroscopic, pendular or other means that function primarily from inertia or gravity relations. Nor to be confused with the so-called robots functioning due to altitude, compass direction, or other generally speaking geographic relations, except that certain robot control functions or results would be advantageously supplemented by the practices of my invention. As, for example, the voluntary setting of rate and range hereinafter referred to could, in part at least, be effected by a robot; that is, when my automatic control is set to desired range of action, by voluntary means, a robot may take the place of said voluntary means to any desired extent. It will also be noted that some of the features of construction lend themselves to added means of control, as, for example, by voluntary action I may change the setting of certain automatic control elements, such as the wing end drags, and voluntarily shift them both to become effective as wind brakes.

The various means I employ are embodiments in the structure or equipment of the aircraft, as will hereinafter be more specifically set forth having for their object, generally speaking, stability through aerodynamic reaction, as distinguished from inertia or gravity control for stability; some examples provide automatic coordination of the ailerons to meet the varied conditions for control, or provide automatic or semi-automatic wing-drag means to effect by positive mechanism the desired results, or automatic means of elevator control in conjunction with flaps or the like, or controlling of leading edge of the wings, and other features,—which may all be embodied in the same plane.

In order that the inventions may be more clearly understood, the basis for their conception and development may be stated as started with fundamentals. Excepting the force of gravity, all forces affecting the control are due to dynamic and aerodynamic reactions from parts on and moving with the plane. Thus, elementary analysis of the motion is with reference to the principal axes of the plane itself, but for practical purposes the components have to be mainly recombined into motion relative to the true vertical and to the geographic directions in a horizontal plane. Hence, it is a fact that the conventional airplane controls, though mechanically simple, are quite complicated in their coordinated operation specially for novices. This may be illustrated by the main control functions and their control, as follows:

| Condition of movement | Controlled by |
|---|---|
| Air-speed | Elevator; stabilizer |
| Climb, or descent | Throttle; (slip, turn, etc.) |
| Slip, or skid | Rudder; (speed) |
| Turning (incl. banking) | Ailerons; elevator |

It will be noted that the elements of motion in their practical effect are quite distinct, but are very much dependent upon each other for the net control, in the broad sense, of the aircraft. This interdependence first results in combining the items into pairs, which in turn are dependent on each other. For example, in making a turn,—instead of using a single control like an automobile steering wheel, the pilot must first coordinate his rudder and ailerons in proper proportion, so as to avoid undesired slipping or skidding. With increasing bank the elevator becomes more important for turning and the rudder for holding altitude. The speed is reduced by the added drag; if the throttle is advanced the rudder and elevator must be readjusted to prevent climbing, and if the same radius of turn is to be maintained the bank must be increased to prevent skidding. As the turn proceeds it tends in itself to increase the bank which must be checked, and this often requires actually reversing the ailerons.

It will thus be appreciated that the improvement of the control system is essentially a single problem, but the aim of my invention is to have means and construction permitting elementary movements of the plane to be made by more elementary movements by the pilot. That is, I provide for elementary control movements by the pilot to accomplish the desired condition of movement of the plane, by automatically coordinating the action of the necessary other control elements involved. In the conventional controls heretofore some of the early difficulties have been somewhat reduced in the mere quantitative features of design and constructions, introducing a limited amount of inherent stability. A few examples cited with reference to certain phases of my invention are:

A dihedral angle in the wings tends to translate a slip or skid into a proper angle of bank, but at the same time it makes an intentional slip or skid more difficult, complicates ground handling, and is worthless in a stall;—I provide lateral control means that in no way interfere with intentional slip or skid, but which automatically maintain the plane in the proper bank for an elementary steering control movement by the pilot.

The usual vertical fin aids directional stability, but interferes with turning and slipping, and is also an adverse factor in the so-called spiral instability and tends to turn a slip into a spin or spiral dive depending upon the condition of pitch, the latter also applying to the rudder if held neutral;—I provide steering means of automatic cooperation between parts responsive to lateral components and differences of longitudinal wind pressure that will function automatically to resist yawing movements or hold the desired rate of turn subject to elementary control movement by the pilot, without objectionable fin and rudder surface.

The usual stabilizer interferes directly with controlled pitch, and for that reason is commonly made adjustable, but the adjustability involves an extra control movement and if not used it is likely to be set wrong, while also it tends to blanket air from the usual rudder in a spin, and also is not sufficiently available for quick nosing down in case the engine stops in a climb. The latter factor is especially serious in large planes because the entire mass of the aircraft has to be turned down through a certain angle before the gravity component will equal the missing thrust that may have ceased almost instantly;—I provide for the automatic coordination of elements which substantially or entirely eliminate these difficulties and which may function automatically when conditions require, and yet are under effective control of the operator. In particular forms my construction greatly helps in quickly nosing down in emergency by cooperation of the main wing surfaces and the elevator, with the elimination of objectionable stabilizer surface.

Although the control means herein described present hitherto unrealized advantages of stability, simplicity and positiveness of control, their intelligent use by the pilot requires suitable instruments or indicating means to inform him at all times as to what his plane is actually doing, particularly its longitudinal attitude or angle of attack, involving conditions of stall and glide as well as progressive flight. Although the indicating feature is the subject of another copending application, it will be appreciated that its coordination with ailerons or flaps and elevator brings it into the scope of combination of one airplane unit with the other automatic features of coordinated control and in the category of accomplishing the plane's control by the simplest and fewest elementary movements of the pilot.

While in the accomplishment of the results of control, in the broad sense, the various means and structures involved in my inventions may be used in combination, certain of them may be used separately and parts of some are involved in certain of my previous patents or patent applications, such as:—Neutralizer vane, No. 1,536,317, patented May 5, 1925, two applications on airplane construction with spring flap, use of rudder and elevator without fin or stabilizer, and vane-operated slots, filed June 16, 1928, application on linkage of elevator, ailerons and flaps, filed December 10, 1928, application on elevator spring adjustment filed April 18, 1929, and my copending application as already mentioned.

It will be noted that my inventions apply in most cases essentially to airplanes, that is heavier-than-air craft, though some features of the inventions may be otherwise usable per se. As they apply in particular to airplanes in the general forms now in use, namely, having one or more wings, fuselage and place for the attachment or embodiment of air reacting vanes or members and means for manipulation, whether it be a land plane, seaplane or flying boat, amphibian or other type, there appears no need of illustrating any specific type in this application, and the accompanying drawings are therefore largely confined to the illustration of typical parts and constructions with their associated main members of the plane. I have also not sought to illustrate all of the various modifications or alternate forms of my control structures, though some may be hereinafter described. Therefore, the accompanying drawings illustrate:

Fig. I is a composite view, part plan of a wing and part elevation of control members, to provide automatic lateral control with voluntary control; Fig. I<sup>a</sup> is an alternative arrangement of some of the parts of the automatic lateral control.

Fig. II is a further development of the class of controlling means in Fig. I, involving servo functioning,—one view "a" in elevation, view "b" of principal operating members in plan, view "c" diagrammatic plan of certain connections, and "d" diagrammatic alternative voluntary control.

Fig. III is a perspective view "a" main wing, fragmentary, with wing-drag control means for automatic or semi-automatic action,—and plan "b" of the principal parts of the drag structure,—and in view "c" I diagrammatically illustrate means for voluntarily combining the action of the wing drags, for purposes hereinafter described.

Fig. IV is "a" front elevation of airplane wing with a particular form of wing-drag embodiment with wing-tip cups, and "b" plan of one end of wing.

These last two figures presenting means for effecting the control functions otherwise in the main heretofore accomplished by a stern rudder.

Fig. V is a perspective view, fragmentary, of a combination of a wing flap or the like, and elevator, interconnected for the effects desired or automatic action,—which symbolizes my improvements in pitch and climb control.

Fig. VI is a perspective, fragmentary, and in part diagrammatic, of the main elements and linkage for automatic servo-control for pitch and climb; while VI<sup>a</sup> shows an alternative floating stabilizer-vane that could take the place of the servo-vane, as applied to the structure in Fig. V.

Figs. VII and VII<sup>a</sup> are elevation in part section and plan of elevator and its support on fuselage stern when no stern rudder is used.

Fig. VIII is a side elevation of an airplane with a front elevator, flap and servo-vane control, inter-connections part diagrammatic.

Fig. IX is a plan view of the plane in Fig. VIII, linkage and some parts diagrammatic.

For facility of description, the particular embodiments of my invention, shown in the drawings, are in some cases composite views, fragmentary, some parts diagrammatic,—and it will be understood do not therefore aim to show quantitatively inter-related areas or other dimensions of the different parts or members.

In Fig. I the two ends of a single wing, each end "a" and "c" different types, are shown in plan, while the middle portion "b" is broken away and an elevation of the fuselage with section of the wing is there shown in relation to the ends of the wing, for convenience of illustration. The wing 1 near its middle has a vertical vane 2 supported on the base 3 passing through an opening in the top surface of the wing and through the wing to an interior, preferably lower pivot 4, providing for oscillation about an axis vertical to the plane. An arm 5 is attached to the base 3 to oscillate with the vane 2. As shown, this arm is inside of the wing, thereby providing convenient attachment of cables for aileron actuation, but illustrated as push-pull links 6 or 6ª. The wing and in the upper part of the figure has a wingtip aileron 7, with horn 8 linked to the right angle lever 9 inside the wing, which in turn is actuated by the push-pull rod 6. The other end of the wing illustrates a different form of aileron, namely on the trailing edge, 7ª, with horns 8ª and linkage to levers 9ª actuated by the push-pull link 6ª. At either end of the wing near the tip is an automatic drag 10 with a voluntary control device 11 and control rod 12, indicated diagrammatically, as leading to suitable linkage so that it may be voluntarily actuated by the pilot,—this wing end drag shown in this figure is shown on a larger scale and described in Fig. III, views "a" and "b".

In Fig. Iª a modified form is shown which essentially provides an alternate vane for the vane 2 shown in Fig. I, namely, Fig. Iª is a front view of a typical wing outline from which projects a vane 13 near one end, although it might in certain cases be located near the middle of the wing, in the manner that the automatic control vane 2 is shown, while also the vane 2 may in some forms be supplanted by two vanes, one near either end of the wing. The vane 13, instead of oscillating about a vertical axis is supported on a hinge 14 substantially parallel to the longitudinal axis of the airplane, thereby providing for its reciprocating laterally, as indicated by the dotted lines, to such angular extent as desired for the particular structure, with due regard to position area and amplitude of the articulation desired for the actuation of the aileron. As shown, the vane 13 has a lever 15 so arranged with respect to the hinge that lateral deflection of the vane 13 actuates control rods and levers 16, preferably inside of the wing, to move the horn 17 (or horns) of the aileron; or the aileron is directly actuated by lever 15 or vane. If one vane 13 is used above the middle of the wing, suitable linkage extends to both ailerons, but as illustrated there is a symmetrically disposed vane 13ª at the other end of the wing, with pivot 14ª, a different arm 15ª connected with push-pull rod 18, with lever and linkage 16ª actuating the horn 17ª of an aileron,—and in this arrangement the linkage, such as push-pull rod 18 lends itself to suitable connections at both ends of the plane for simultaneous coordinated deflection of the aileron at either end. The control vanes in any event have substantial lateral projected area in their normal position wherever located, either singly or in pairs, and preferably have suitable means, such as springs 19—19, attached to the actuating linkage (or the vane), tending to maintain the vane in a neutral position substantially parallel with the axis of the airplane, and with predetermined proportions suitable to accomplish the desired amplitude of reaction, with respect to air-current forces when in flight. This neutralizing device may also be connected with the manual controls so as to provide that upon a certain setting of turn or slip voluntarily by the pilot the neutralizing or centering device connects the automatic variations within a predetermined range, and the control may be provided with an adjustable yielding stop point by such a device as illustrated and described with respect to Fig. V.

The functioning of the above described structure will be now understood as producing a predetermined and desired deflection of ailerons, by the relative effect upon such vanes as 2, 13 or 13ª, which vanes will turn on their axis or hinge, relative to the wing, by lateral pressure. This lateral pressure may be from any cause, which requires the aileron compensation to maintain the desired stability of the airplane, but in particular the lateral pressure will be caused with increasing force as the plane tends to turn right or left from its direction of flight, when the resulting skid will cause a proportionate lateral pressure on the vane or vanes, so that through the connections with the ailerons the latter will cause the plane to bank to the angle desired for that turn. As the turn continues the plane might tend to slip, which would cause an opposite lateral force on the control vane, and thereby automatically deflect the ailerons to the required degree to modify the bank of the plane the amount necessary to resist further slipping. Likewise, if the slip occurs in straight flight,—then the resultant increase of lateral pressure on the vane causes the vane to function and actuate the ailerons in a way that rectifies the motion to automatically maintain stable flight. In certain designs I prefer to support such winged-end vanes with a slight initial inclination with respect to the longitudinal plane of symmetry, which may be described as toeing-in, in order to get the effect of a presensitive lateral control. I may also employ an initial V slant (outward on top), which introduces an element of automatic resistance to rolling motions.

In the form shown the means for directly causing a turn in voluntary by the pilot, consisting of suitable wing end drags, so that the pilot may cause a drag at one end which starts the turn, and by the control more fully described with respect to Fig. III,—the rate of turn is thereby voluntarily established. It will thus be seen that the voluntary elementary action of the pilot in setting or changing the degree of drag at one of the wing ends, or both, starts the turn, and all of the other mechanism automatically brings into action the necessary parts to correctly maintain the degree of bank, and when desired the return of the plane to straight flight.

In the form shown it will be noted the coordinated turning and banking, as well as the return or maintaining of straight flight in the direction of thrust are accomplished by one single, simple control movement by the pilot,—while automatic means effect the required coordination with accuracy determined by the properly designed dimensions and adjustment of the parts of the automatic means, thereby meeting positively any variation of aerodynamic action to maintain stability, that is holding a given desired condition of turning or straight flight;— the maintenance of such stability is not dependent upon the observation or lack of observation of the pilot, nor upon his judgment or his further action, beyond his mere initial elementary control action. It will be understood that intentional slip or skid are at times desired, and for such I provide pilot superimposed control means to counteract or adjust the automatic action on the ailerons, either directly or indirectly.

The above phases of control may involve forces for manipulation, as in the case of large airplanes, for which the automatically actuated parts require additional power, or a nicety of manipulation at a minimum of effort with a minimum of momentary fluctuations,—that is steadiness,—and this may be accomplished in various ways for which I have shown one example as a servo-control arrangement in place of the vane 2, Fig. I.

This is illustrated in Fig. II, in which the wing 1 has mounted upon it the shaft 20 suitably supported for limited oscillation about its axis, surrounded by the sleeve 21, also mounted for limited oscillation on its axis and with any suitable bearing 22, and having attached at one end the frame base 23 with a brace 24 adapted to hold shaft or pintles 25—25 providing a vertical axial support for a servo-vane 26, having a leading edge 27 ahead of its axis and suitable dimensions to provide the desired degree of underbalance to provide proper functioning. This servo-vane 26 has horns, or one horn 28 with push-pull rod 29 (or two horns and two cables) hinged to horn 30, firmly attached to oscillate with shaft 20. In view "a" the elevation shows an arm 31 attached to the shaft 20, and suitable means to voluntarily reciprocate the arm 31, the means being shown diagrammatically as 32 to indicate any connecting push-pull rod and operator's lever or wheel, or any equivalent mechanism.

In view "b" of this figure, a plan view of view "a" is shown, thus illustrating that the arm 33 attached to the sleeve 21 is subject to reciprocation by the oscillation of the sleeve effected by the member 23, deflected by the vane 26. Thus the control effecting action of the structure leads from the automatically deflected arm 33 to the push-pull control link 34 (or by duplication of the arm 33 and two cables), which lead to and actuate a floating pivot or fulcrum 34ᵃ carrying the two-armed lever 35 to actuate respectively the ailerons at opposite ends of the wings, as indicated by the arrows 35ᵃ—35ᵇ.

In view "d" is shown a similar floating two-armed lever 35, but the fulcrum or pivot 36 is actuated by linkage 36ᵃ to a voluntary control-bar 37, and not by the automatic means as in view "c"; this floating lever with its pivot shifted voluntarily by the pilot would apply to the arrangement shown in Fig. I, wherein one end of the floating lever, as indicated by arrow 6, would be connected to the actuating lever 5, and at the opposite end of the floating lever the connections would be as diagrammatically indicated 39—40, to the ailerons at opposite ends of the wing.

In the form shown in Fig. Iᵃ similar servo may be used, and floating linkage connections. In all of these aileron control means it will be understood that some degree of automatic action is maintained to produce the proper bank in response to the steering control now to be described.

In Fig. III a fragmentary part of a wing near one end, is shown in perspective, in which I provide a part controllable and part automatic drag for the wing end. The particular form illustrated has a longitudinal beam or bulkhead wall 41, and substantially parallel to the longitudinal axis of the airplane a tube 42 extends from the bulkhead with a slightly protruding end 42ᵃ opening through the leading edge of the wing so arranged that the air pressure at that point in the leading edge is effective through the tube and into a confined chamber behind the bulkhead 41. The intake of the tube is, however, regulated by voluntary means effecting the flow of air engaging the leading edge adjacent the tube end 42ᵃ, and while this may be accomplished in many ways the form shown involves a sliding block or excrescence 43 fitting on the wing surface, being adjusted back and forth along the leading edge, so that its curvature causes a predetermined diminution of pressure in the tube 42. Lever 44 serves for this purpose with a connection 45 diagrammatically indicating connections with link or cable for voluntary adjustment by the pilot. Thus the excrescence 43 is a servo-means controlling, by a light adjustment force, the air pressure of any degree exerted at the intake of the tube 42, and the tube 42 is an air scoop for pressure on the other members to be described, and its position on the leading edge, slightly above the lower chord of the wing determines the effect under different conditions of flight, and in the approach of a stall on one side becomes particularly responsive in view of the enhanced effect of the servo 43.

The air scoop 42 leads directly into a variable capacity cavity 46 having the wall 41 with two ends 47 forming an airtight box with an oscillating piston vane 48 hinged at 49, and airtight at the hinge and with suitable packing at the edge 50 engaging the part cylindrical wall 51 of the box. To the piston or plate 48 is attached a drag vane 52 which the air pressure on piston 48 projects below the lower surface of the wing and which with reduced air pressure in the box recedes into the box. The lower surface under the box has a slot for the drag-vane and also has holes 53 preferably near the hinge which allow free movement, and thereby avoid accumulation of too much pressure between the piston plate 50 and the lower surface covering of the wing. To the hinge 49 is attached a lever 54, which in the form shown is radially arranged inside the wing where its reciprocation can be linked as by push-rod 55 to an elbow lever 56, which through linkage 57 connects with a lever 54ᵃ on the drag-vane mechanism at the other end of the wing.

In this way the relative reaction is balanced at both ends of the wing provided equal pressure at the scoop pipe 42 and 42ᵃ exists, under which condition the drag-vanes 52 and 52ᵃ are in a position, preferably, retracted into the wing and presenting no drag resistance at either end. Thus with an increased speed of one wing end compared with the other, as in the case of yawing, the drag at one end will become effective to counteract the yawing tendency. Likewise an intentional turn is produced by voluntary varying by the deflector 43 at the proper wing end, the pressure of the air in the control pipe 42, so that a definite degree of drag is provided so long as there is a differential pressure in the drag actuating box at one wing end or the other. The exact dimensions and the degree of actuation of the drag, and other parts will of course vary with the size of ship and the flying characteristics for which it is designed, but as to structural parts the dimensions are readily adaptable within the permissible wing construction to give all the effective results desired.

In addition, the two wing end drags, such as 52—52ᵃ may be projected at the same time below the lower surface of the wing, and to an equal extent, thereby creating a wing drag at both ends of the wing, which becomes a braking effect on the speed of the plane. As illustrated in Fig. IIIᶜ, the cable connections, such as 55ᵇ—55ᶜ are reeved around a movable sheave 55ᵈ, and as indicated by the arrow this sheave may be voluntarily released so that it releases the cable in a way that permits both wing drag vanes 52—52ᵃ to project below the wing ends.

Fig. IV shows a modified form of wing end drag, to accomplish lateral steering without a tail rudder, or may be called a drag "rudder", in a different form from that shown in Fig. III. This consists of wing tip cups 60 which are housed at each end of a wing respectively, and are supported in the wing structure to provide their extension beyond the wing to form additional resistance or drag, or retracting them into the wing structure. The view "a" is a fragmentary front elevation of a wing and the outline of fuselage in section, part diagrammatic or typical structural elements being shown for purposes of illustration. The wing tip cup 60 is shown extended to exert a drag while the cup 60ᵃ at the opposite end of the wing is retracted to offer no added resistance. These wing tip cup-drags are connected by push-rod 61, in part convenient to the body of the plane. This link may have an attachment as 62 adapted to be moved longitudinally of the wing by cables 63 leading through springs 64 to a sheave 65 and a drum 66, so that they may be manipulated by a hand-wheel 67, by the pilot, to move the push-rod 61 back and forth and to actuate the wing tip cups voluntarily. Besides the voluntary movement, springs 64 permit a limited degree of yield, so as to permit the exact projection of effective area of wing tip drag to be regulated by other devices, namely, in the form shown, automatic means which function with the air reaction through windmills 68—68ᵃ. These two windmills are equi-distant from the middle of the wing, and in straight flight these windmills would both react equally; but with a turning about the vertical axis of a plane the increased reaction on one windmill would cause it to drive the push-rod 61 in the desired direction to restore straight flight. This may be accomplished by each propeller having a shaft 69 with a gear 70 engaging a rack 71, with suitable bearings to assure registration and proper functioning.

However, the control propellers 68—68ᵃ may be of a variable pitch type, so that the blades may be changed and thereby vary the force transmitted in suitable manner to the push-rod 61. For example, on the propeller shaft a sleeve 72 may serve to vary the propeller blade pitch, and the sleeve may be manipulated by elbow-lever 73 with a control linkage 74 leading to the cockpit, for voluntary actuation by the pilot. In such form the pilot's operation consists of varying the pitch of one or the other of windmills 68—68ᵃ, and thereby in turning varying the balance of the reaction of the two windmills, so that the wing tip drag on one end or the other will be projected beyond the wing and add the desired resistance to cause the "rudder" effect of a desired rate of turn of the plane about its vertical axis. This and various other servo-control means may be used to accomplish the desired result with but a fractional effort on the part of the pilot, compared with the force required to move directly the effectively controlling parts.

It will be understood that these methods for drag-control of the wing end, instead of tail rudder, and the laterally banking automatic control means as illustrated by examples in Figs. I, Iᵃ and II, cooperate to effect the rate of turn and the required bank and maintain such stability automatically with the varying conditions of wind.

I wish also to make clear that the steering control means above described determine principally the rate of turn or yawing movement. A certain residual positive stability against yaw itself (in a static sense) is also desirable. The latter will usually be sufficiently obtained from the proportions of the airplane itself, but it may be amplified if desired by a toeing out of the reacting units so as to make them more responsive to side wind components. The same effect is obtained in Fig. III by the close inboard proximity of the servo-knobs 43.

As the turning, including the proper bank, thus becomes a simple matter of turning the wheel or other steering control and holding it at a fixed setting, the simultaneous control of pitch then becomes per se a much easier process. However, I have further simplified the control of pitch by use of certain automatic and servo features, now to be described, and have also combined the steering and pitching control into a single hand-operated control unit, as will be described.

In Figs. V and VI the automatic control for pitch and climb is illustrated in specific forms which may be variously modified, one illustration being a servo-control of the required vanes that accomplish that purpose.

In Fig. V part of a wing is shown in perspective, a typical section being about the middle of the wing and having on its trailing edge a flap 80, half shown dotted, the section showing the hinge or pivot 81 with horn 82 and push-rod 83 actuated by lever 84 which typically indicates a voluntary control means by the pilot, adjustable back and forth to raise or lower the flap 80. Between the lever 84 and rod 83 are springs 86 with suitable stops 87, preferably adjustable, and stops or collars 88 which have a limited play on the rod 85. This arrangement permits the voluntary deflection of flap 80, but with spring resistance and a certain amount of play that permits the flap 80 to yield automatically with a preponderance of air reaction in a vertical component direction, or due to the influence of an interconnecting elevator plane or vane, or else the flap may be actuated by a servo-vane automatically, as hereinafter described.

To the above described flap is connected an elevator 89, a horn 89ᵃ by push-pull rod 90 to horn 82ᵃ on the flap 80. This cross-connection, as shown, applies in the case of a preferably over-balanced elevator to the rear of the flap.

In the particular form shown in this figure the flap 80 is underbalanced and the elevator 89 is so supported as to be over-balanced, the degree and the relative dimensions being, of course, designed for any particular case to assure the automatic action and cooperation. In this arrangement the deflection of the flap 80 tending to effectively turn the entire wing up or down, simultaneously actuates the elevator to lift or lower the tail of the airplane,—so that the cooperation of both these surfaces results in a far greater effective pitch or climb-change in the entire plane. While with certain constructions, particularly small planes, the operator may "set" the two control surfaces to maintain a desired degree and stability of pitch, the incidental fluctuation of air flow component in the direction of the vertical axis of the plane may further be utilized to cause automatically slight variations in flap or elevator in order to maintain the desired conditions, namely, to stabilize automatically the degree or maintenance of pitch and climb desired.

In the linkage, as for example in any of the connections to the elbow-lever 91$^e$, or at the control-column 97 suitable limited yielding connections may be interposed, (such as described with reference to parts 86—87—88, in Fig. V), but such yielding resilient connections are preferably between the column 97 and a member such as the elbow-lever 96$^a$.

In the case of the form shown in Fig. VI the vane 91 is an under-balanced vane forming an automatic servo-control by being pivoted at 92 on a suitable hinge supported by out-rigger members 93—93$^a$ suitably attached to the flap 94, so that the movement of the out-rigger up or down moves the flap 94 about its pivot 94$^a$, and the horn 94$^b$ connects with push-rod 95 and the horn 89$^a$ of the elevator 89 suitably pivoted at 89$^b$ on a tail structure (not shown) of the airplane. This servo-control is actuated through the horn 91$^a$ with link 91$^b$ leading to a lever 91$^c$, which is pivoted to oscillate about the same axis 94$^a$ of the flap 94, but does not oscillate with the flap,—on the contrary it is connected by link 91$^d$ to elbow-lever 91$^e$ and by means 96, diagrammatically shown, to a control-column 97 operated by the pilot, so that the setting of the servo-vane is under the voluntary control of the pilot.

Another variation is shown in Fig. VI$^a$, the vane 101 being here substituted for vane 91, though various modifications or alternative arrangements and constructions may more or less serve the equivalent purpose. As shown, I provide here for means to actuate the push-pull rod 96, namely, a link 98 and a lever 99 pivoted at 99$^a$ in the lower portion of the fuselage, and having another arm 100 operating said lever 99 but extending downwardly and rearwardly from the fuselage and supporting at an end remote from and out of the turbulence of the airplane surfaces a floating vane 101, which is rigidly supported above the extremity of arm 100 with a suitable skid 102 protecting the floating vane 101 from contact with the ground or other obstructions. This long arm and floating vane are shown in my other co-pending case, and have been used by me and demonstrated as practical in my experiments, and in said other application are referred to in connection with indicating devices for the pilot's information. As shown herein, the floating vane is of such section and aspect that it maintains the arm 100 in desired angular position with respect to the longitudinal axis of the plane, or varies its position dependent upon the relative air speed of the plane. Thus the swing in a vertical plane of the arm 100, or more properly the variation of its angle with respect to the axis of the plane will cause the vane to pull downward away from the plane when the relative air current increases with decreased angle of attack, and as the airplane approaches a stall such as when climbing, the floating vane 101 will rise relatively, thereby pushing the link 98 and the linkage above it to actuate through the connections the servo-vane 91, thus elevating the flap 94, forcing the wing down,—and shifting the elevator to pull the tail. In this manner it will be seen that the automatic action of the floating vane 101, when approaching a stall, does not depend upon the pilot's observation nor on his action, but mechanically actuates the flap and elevator in the required direction to stop the climb and start a dive, which will be continued until the floating vane reaches a position due to the recovery of the speed of the plane, so that again the flap and elevator are regulated to maintain the safe and proper angle of flight relative to the air.

It will be seen that stable flight is attained and maintained in any desired degree of turn and pitch by automatic means predesigned to produce the results,—subject only to the general degree or range of turn and pitch being entirely under the control of the pilot by the simple voluntary means, namely, as preferably proposed the turning and longitudinal movement of the wheel. These two most normal and dependable functions are in fact the simplest elementary actions for the pilot,—and anything else such as a voluntary slip or a desired skid I preferably accommodate by a foot-control, or some distinctively less coordinated voluntary act by the pilot. The throttle is for various reasons subject to a separate and distinct motion on the part of the pilot, and I prefer to make this in part a foot-action because with my automatic means for other functions the feet are now relatively freed for such purpose.

As such constructions aim to include means superseding the usual rudder, the elevator whether in the tail, or forward of the wing may be differently constructed and mounted than heretofore. Particularly is this the case when no rudder is supported at the tail of the fuselage or at the tail of any rear out-rigger, and permits of a much improved elevator construction as, for example shown in Fig. VII elevation, and plan Fig. VII$^a$, in which 110 is the main body of the elevator, 111 are pivots supporting a cantilever beam 112 for oscillation about an axis transverse of the airplane, and in the form shown it is at the end of the fuselage 113. The leading edges 110—110$^a$ extend forward of the rearmost portion of the fuselage tail and may be underbalanced or over-balanced, to meet aerodynamic characteristics, and the trailing edge of the vane may have suitable balance weight 114, to provide the desired characteristics. With this construction the horns 115 lead into an opening in the end of the fuselage tail and are attached to cables or push-pull rod 116 passing through the interior of the body and by suitable linkage to the voluntary controls or the automatic control linkage.

While a rear elevator, in any of the combinations heretofore described serves its purpose, I may provide a front elevator which under certain conditions is preferable, and when a rear rudder is supplanted by wing and drag means for steering, the heretofore usual tail construction of an airplane may be eliminated.

Thus an embodiment of my invention as shown in Figs. VIII and IX illustrates the main changes in construction, to which may or may not be added other features of automatic control heretofore described. In these figures a wing 120 may be combined, as shown, with a short fuselage 121, but this may be nothing more than the large middle section of the wing in a big ship, or any enlarged middle section of a wing. The propeller or propellers may still be on the leading edge of the wing, or otherwise suitably arranged at the nose of the body or bodies, and suitable running gear with wheels, pontoons, skis, etc., while with a flying boat suitable arrangement may likewise be made embodying the essential features for my improved control.

As shown, a front under-balanced elevator 122 is supported by out-riggers 120ª, which may be single structural members or otherwise, rigidly supporting the shaft bearing or hinge 122ª of the elevator. This front elevator would be underbalanced but for having a weight 122ᵇ forward of the pivot. The horn 122ᶜ with push-pull rod 123 transmits the deflection of the front elevator to the flap 124 on the trailing edge of the wing through a horn 124ª. This flap in turn has a servo-vane 125 for control supported by suitable out-rigger members 125ª—125ᵇ, so that the outrigger swings up and down with the flap 124. A lever 126 mounted on the axis of the pivot or hinge 124ᵇ of the flap provides the desired connection through rod 126ª to the horn 126ᵇ, so that through suitable connections 127, diagrammatically indicated, the voluntary control of the servo-vane is accomplished, which in turn actuates the flap and the coordinated front elevator. As an alternative, the same general type of servo-vane may be mounted on the elevator. It will also be understood my automatic means may be connected or hooked up with other controlling vanes or devices, as, for example, the various devices cooperating at the leading edge or on top of the wing.

It will thus be noted that I have heretofore shown and described only specific forms of the different features of my invention, and have described their cooperation, but that various modifications may be made, and alternative structures may be used for equivalent results. In general, I provide means whereby voluntary control by two functions, such as a turning of a hand-wheel or the like, and pushing the hand-wheel forward or back,—thereby setting a desired range of turn or a desired range of pitch or climb,—and supplementing such two elementary actions by the pilot, the automatic results are the maintenance of the rate of turn, as by wing end drags eliminating tail rudder and the tail stabilizer and fin, automatically providing the proper banking and automatically providing the desired condition of pitch. Such automatically controlled results within the range voluntarily set, leave for the pilot, in a different category, the question of engine control by throttle, effecting a voluntary slip, actuating brakes on the undergear or aerodynamical. These latter control functions may readily be by foot power, thus leaving only the two hand operations of controlling turning and pitching, thereby simplifying the operation of the airplane. The secondary voluntary operations by the pilot, such as throttle and brake, may be by hand or foot without any interference with the two elementary motions first described for normal control in flight, which summarized may be two operations for voluntarily setting the means which thereafter automatically control the attitude of the airplane in three ways, namely, about the vertical, longitudinal and horizontal axes.

While not limiting myself to the particular embodiments herein shown, nor to the combination of all of the automatic or semi-automatic features, as used together, what I claim and desire to secure by Letters Patent is:

1. In an airplane, automatic means mechanically actuated by lateral wind components for maintaining and varying its attitude about a longitudinal axis, mechanical automatic means actuated by difference of speed of the two wing ends for controlling the turning about a vertical axis, automatic means for controlling the plane about a transverse axis in flight, and coordinated voluntary control means to set one or more of said automatic means to a desired range of automatic operation.

2. In an airplane, automatic control for maintaining and varying the attitude of the plane in flight with respect to its longitudinal axis, its vertical axis and its transverse axis including an automatically actuated vane for maintaining proper bank, automatically actuated wing end drag units for maintaining straight flight or a given rate of turn, and voluntary control means to set two or more of said automatic controls to a desired range of automatic operation.

3. Controls for an airplane in flight, having automatic means for maintaining and varying attitude about its longitudinal axis and its vertical axis, an automatically actuated vane responsive to lateral air movements associated with the former of said means, and coordinated voluntary control devices for setting both of said automatic means to a desired range of automatic operation.

4. Controls for an airplane in flight having automatic means for maintaining and varying attitude about its longitudinal axis and its transverse axis, including an underbalanced flap interconnected and cooperating with an overbalanced elevator.

5. In an airplane, means combined with the wing ends for effecting the rate of turning in flight about a vertical axis having elements automatically responsive to the difference of air pressure at the opposite wing ends, and means for varying voluntarily the air pressure in its effect upon said automatically actuated elements.

6. Airplane turning control mechanism including automatically responsive wing end drags, and means for voluntarily controlling the effective air pressure on said drags to voluntarily limit the automatic action within a predetermined range.

7. In an airplane, means for controlling the attitude of the airplane about its transverse axis, including an overbalanced elevator rearwardly remote from the centre of gravity (or from the wing), an underbalanced wing flap responsive in a reverse vertical direction from the elevator adapted to impress downward or upward movement of the wing, and interconnections between the wing vane (or flap) and the elevator for automatic conjoint action (to quickly effect a pitch or climb), and means for yieldingly neutralizing the position of the wing vane or flap.

8. Airplane control for flight attitude about its transverse axis, having an underbalanced wing flap and an overbalanced elevator interconnected and subject to automatic conjoint action within a predetermined range, and voluntary means for control of the range of automatic action.

9. In an airplane, ailerons for lateral control, an underbalanced trailing flap on a main wing, a longitudinally remote overbalanced elevator vane and interconnections for reverse movement of the flap and elevator coordinated to produce a quick response to the changing directional movement of flight about a transverse axis of the plane, and means for yielding neutralizing the motion of the flap.

10. In an airplane, an adjustable drag vane near each end of the wing, interconnections to balance the same against each other and means for voluntary adjustment for either or both to alter the ratio of the drags with respect to each other.

11. In an airplane, wing end drags each having means for varied projection of a drag vane below the wing surface or withdrawing it into the wing, dependent upon the air speed of the wing end, and means for varying voluntarily the effect of the wind speed at either end to regulate the drag vane projection.

12. In an airplane, a wing end variable drag, wind operated means to vary the projection of the drag vane beyond the wing surface and voluntary controlled means to vary the effect of the wind speed on the vane operating mechanism.

13. A pair of drag units for an airplane, having articulated vanes balanced against each other, air pressure operating means to project varying effective drag area of said vanes, and means effective with the velocity of flight for varying the air pressure in said actuating means.

14. In an airplane, wing end drags including near each end of a wing an articulated vane actuated by air pressure due to the velocity of flight to control the projection of effective drag area of each vane, and connections to voluntarily regulate the position of each said vanes.

15. In an airplane, a pair of windmills near opposite ends of the wing, connections with said windmills for projecting a wing drag at each wing end proportionate to the difference in wind speed reaction of each windmill, and voluntary means for varying the relative reaction force of each windmill to the other.

16. In an airplane or other craft, laterally and oppositely disposed drag vanes normally retracted within the wing, with connections whereby the drag of one side alone may be increased for steering purposes, or the drag of both simultaneously increased for braking purposes.

17. In an airplane aileron control, operating connections responsive to lateral components of air currents including a lever to maintain a substantially equal deflection of opposite ailerons, a shifting fulcrum for said lever, and means for shifting said fulcrum, whereby a change in deflection of ailerons is voluntarily set.

18. In an airplane, a control lever, means responsive to lateral components of air flow for shifting the fulcrum of said lever, a pair of ailerons one near each wing end and connections from each aileron to said lever, whereby the downward force on one aileron maintains substantially a balance with the upward force on the other, and means for voluntary regulation of the fulcrum of said lever.

19. In an airplane, dip-and-climb control comprising a flap, an elevator and connections for simultaneous and reverse deflection of flap and elevator, a servo-vane supported from said flap and means for voluntary control of the servo-vane.

20. Controls for an airplane in flight having automatic means for maintaining and varying attitude about its transverse axis, including an underbalanced flap interconnecting and cooperating with an overbalanced elevator.

21. In an airplane, dip-and-climb control comprising a flap, an elevator and connections for simultaneous and reverse deflection of flap and elevator, a servo-vane supported from said elevator and means for voluntary control of the servo-vane.

22. In an airplane, means for controlling the attitude of the airplane about its transverse axis, including an aerodynamically underbalanced elevator rearwardly remote from the centre of gravity of the plane, an underbalanced wing flap responsive in a reverse vertical direction from the elevator adapted to impress downward or upward movement of the wing, and interconnections between the wing vane and the elevator for automatic action, and means for yieldingly neutralizing the position of the wing vane or flap.

23. In an airplane, means for controlling the attitude of the airplane about its transverse axis, including an aerodynamically underbalanced elevator rearwardly remote from the wing, an underbalanced wing flap responsive in a reverse vertical direction from the elevator adapted to impress downward or upward movement of the wing, and interconnections between the wing vane and the elevator for automatic action, and means for yieldingly neutralizing the position of the wing vane or flap.

24. Airplane control for flight attitude about its transverse axis, having an underbalanced wing flap and an aerodynamically underbalanced elevator interconnected and subject to automatic conjoint action within a predetermined range, and voluntary means for control of the range of automatic action.

25. In an airplane, ailerons for lateral control, an underbalanced trailing flap on a main wing, a longitudinally remote aerodynamically underbalanced elevator vane and interconnections for reverse movement of the flap and elevator coordinated to produce a quick response to the changing directional movement of flight about a transverse axis of the plane, and means for yieldingly neutralizing the motion of the flap.

26. In an airplane, an automatic controlling mechanism responsive to the angle of attack of the plane through the air, interconnected means for quick turning effect of the plane about a horizontal axis by wing lift control and longitudinally remote aerodynamically underbalanced elevator, whereby the increased angle of attack approaching a stall will cause automatically a nosing over of the plane.

27. Airplane control for flight attitude about its transverse axis, having a wing flap and a front elevator interconnected and subject to automatic conjoint action within a predetermined range, said elevator being statically balanced or overbalanced, and voluntary means for control of the range of automatic action.

28. Airplane control for flight attitude about its transverse axis, having an underbalanced wing flap and a front elevator interconnected and subject to automatic conjoint action within a predetermined range, said front elevator being statically balanced or overbalanced, and voluntary means for control of the range of automatic action.

29. In an airplane, automatic means to counteract spiral instability consisting of a pitching-control vane responsive to angle of attack, a rolling-control vane responsive to yaw, and a directional control responsive to the difference in air speed between the two sides of the airplane, two or more of the said means being also under the control of the pilot.

30. Controls for an airplane in flight, having automatic means for restoring straight flight from spiral flight, the combined yawing and turning toward the low side actuating ailerons and drag vanes in a direction to depress and slow down the upper and faster side of the airplane relative to the lower and slower side, said ailerons and drag vanes being also under the control of the pilot.

31. Controls for an airplane in flight, having automatic means for maintaining and varying attitude about its transverse axis, including an aerodynamically under-balanced flap interconnected and cooperating with an aerodynamically over-balanced elevator.

32. Airplane control for flight attitude about its transverse axis, having an aerodynamically under-balanced wing flap and an aerodynamically over-balanced elevator interconnected and subject to automatic conjoint action within a predetermined range, and voluntary means for control of the range of automatic action.

RALPH H. UPSON.